(12) United States Patent
Penn

(10) Patent No.: US 8,736,148 B2
(45) Date of Patent: May 27, 2014

(54) MULTIPLE DEGREE OF FREEDOM ACTUATOR AND METHOD

(76) Inventor: James Douglass Penn, Cambridge, MA (US)

(*) Notice: Subject to any disclaimer, the term of this patent is extended or adjusted under 35 U.S.C. 154(b) by 195 days.

(21) Appl. No.: 13/464,943

(22) Filed: May 4, 2012

(65) Prior Publication Data

US 2012/0280592 A1 Nov. 8, 2012

Related U.S. Application Data

(60) Provisional application No. 61/482,273, filed on May 4, 2011.

(51) Int. Cl.
*H01L 41/08* (2006.01)
(52) U.S. Cl.
USPC .......................................................... 310/339
(58) Field of Classification Search
USPC .................................................. 310/329, 339
See application file for complete search history.

(56) References Cited

U.S. PATENT DOCUMENTS

| 7,821,183 B2* | 10/2010 | Rastegar ........................ 310/339 |
| 2007/0278902 A1* | 12/2007 | Rastegar et al. ............... 310/339 |
| 2010/0236329 A1* | 9/2010 | Rastegar et al. ............ 73/514.34 |
| 2011/0074162 A1* | 3/2011 | Cottone et al. ................. 290/1 R |
| 2013/0049538 A1* | 2/2013 | Rastegar ........................ 310/329 |
| 2013/0162105 A1* | 6/2013 | Goydin .......................... 310/339 |

* cited by examiner

*Primary Examiner* — Mark Budd
(74) *Attorney, Agent, or Firm* — Ascentage Law, PLLC; Travis L. Johnson

(57) ABSTRACT

Systems and methods for creating a multiple degree of freedom (DOF) actuated device having a single transducer source, wherein each DOF is individually actuated by a particular amplified response frequency and wherein simultaneous multiple DOF actuation is possible through superimposing multiple frequencies. Further included are several embodiments rectifying DOF(s) into a continuous output motion.

19 Claims, 14 Drawing Sheets

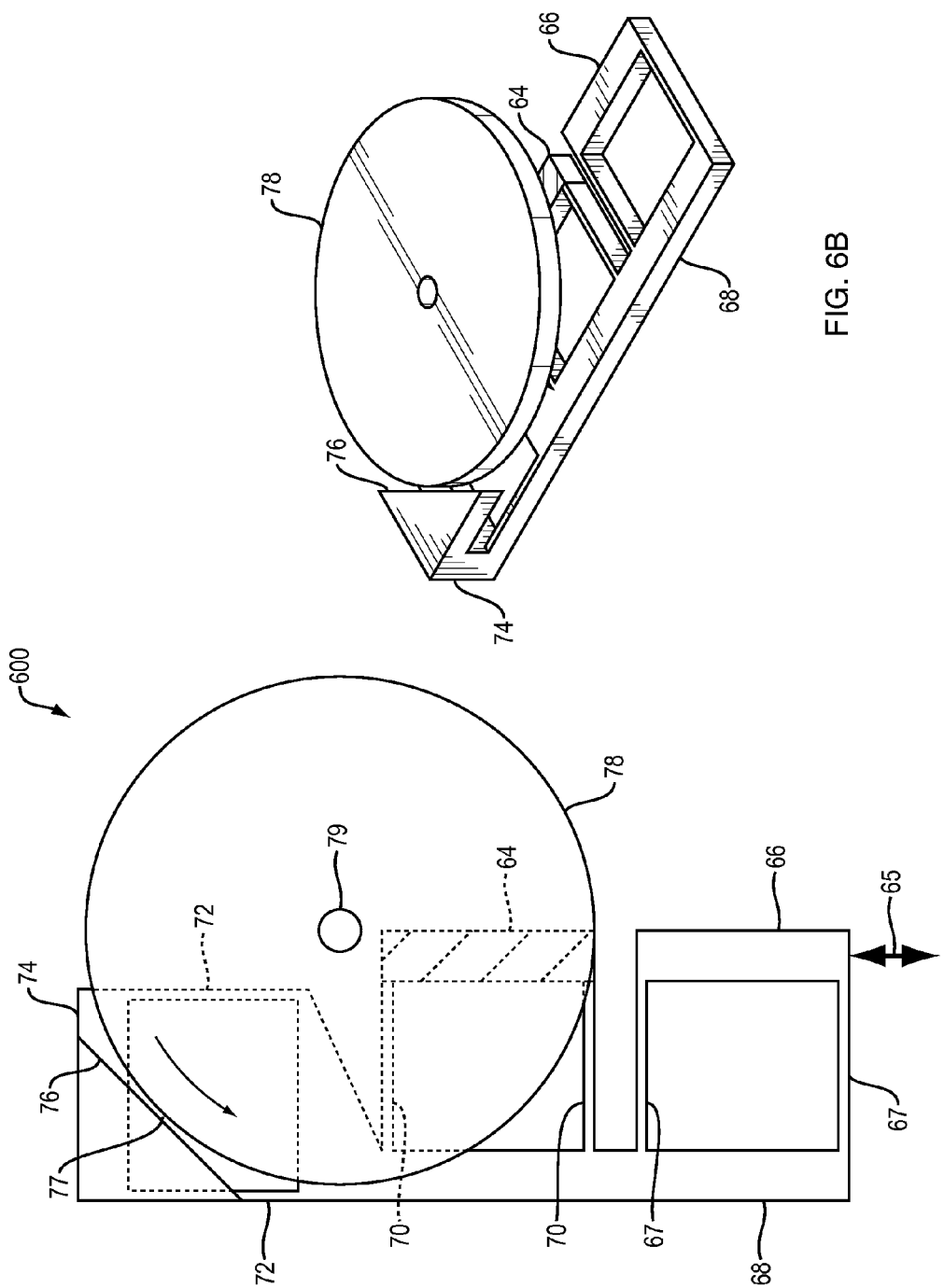

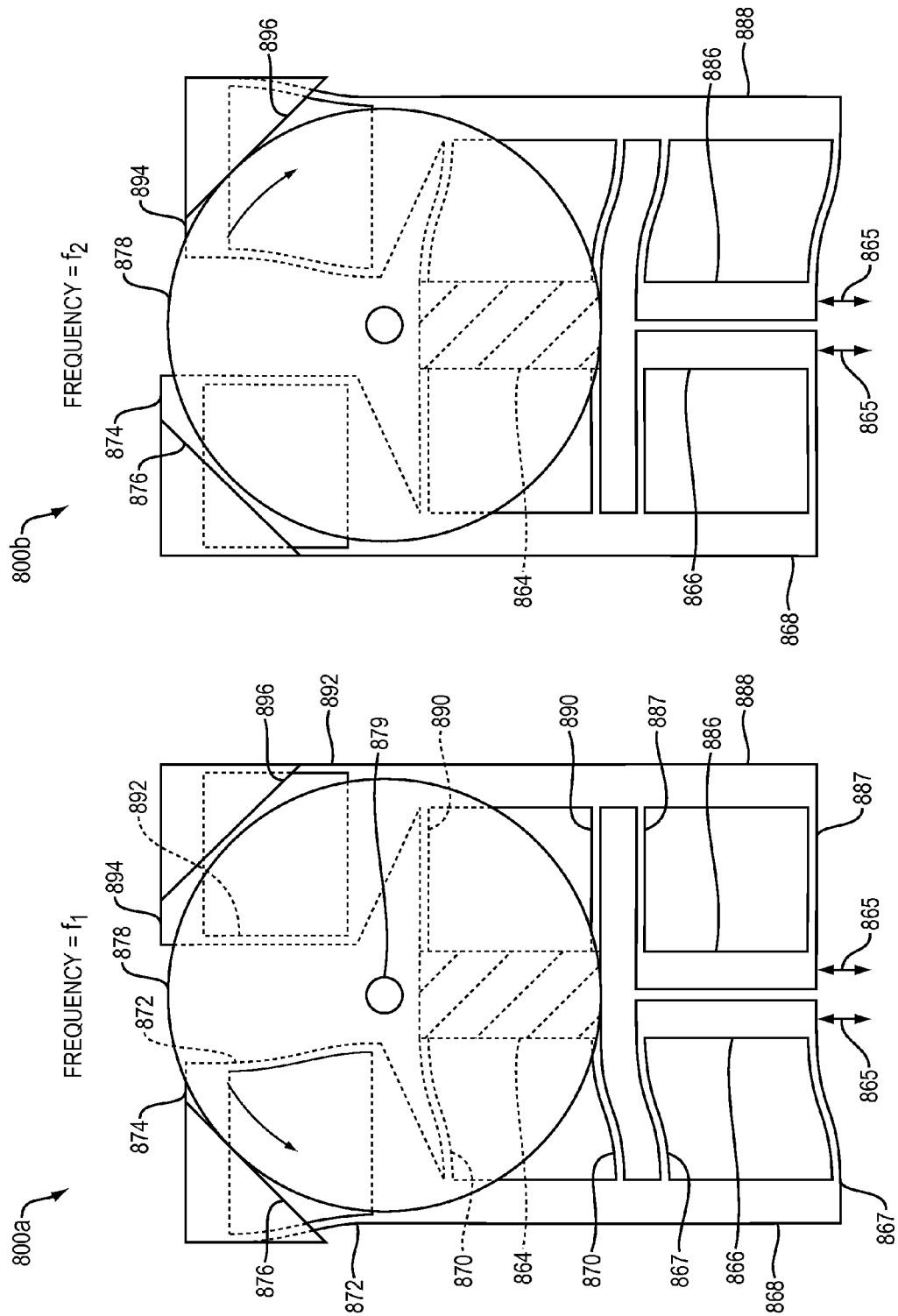

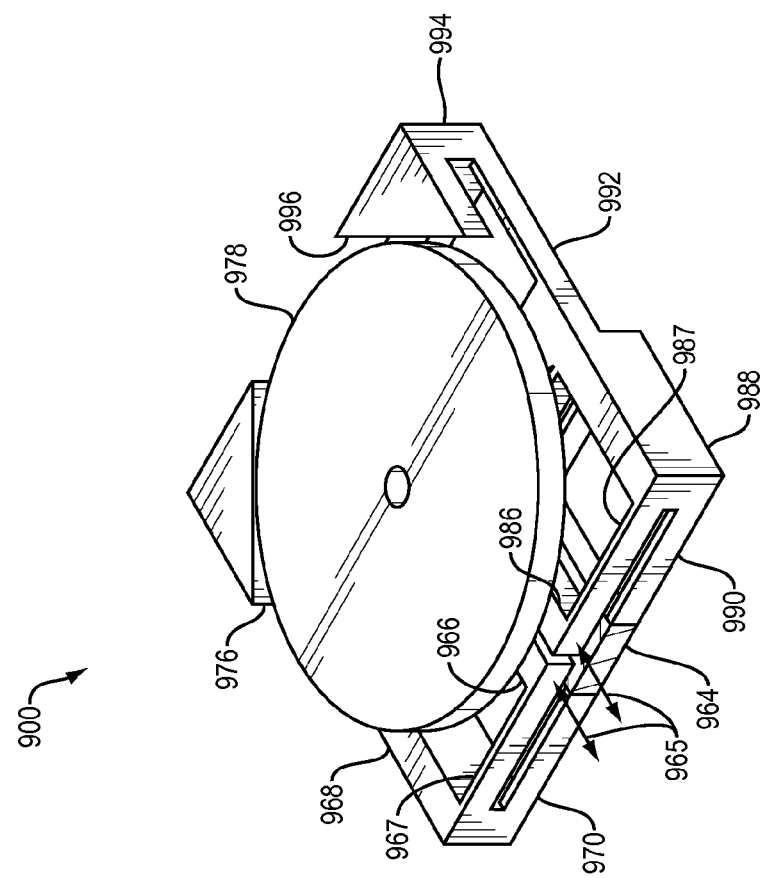
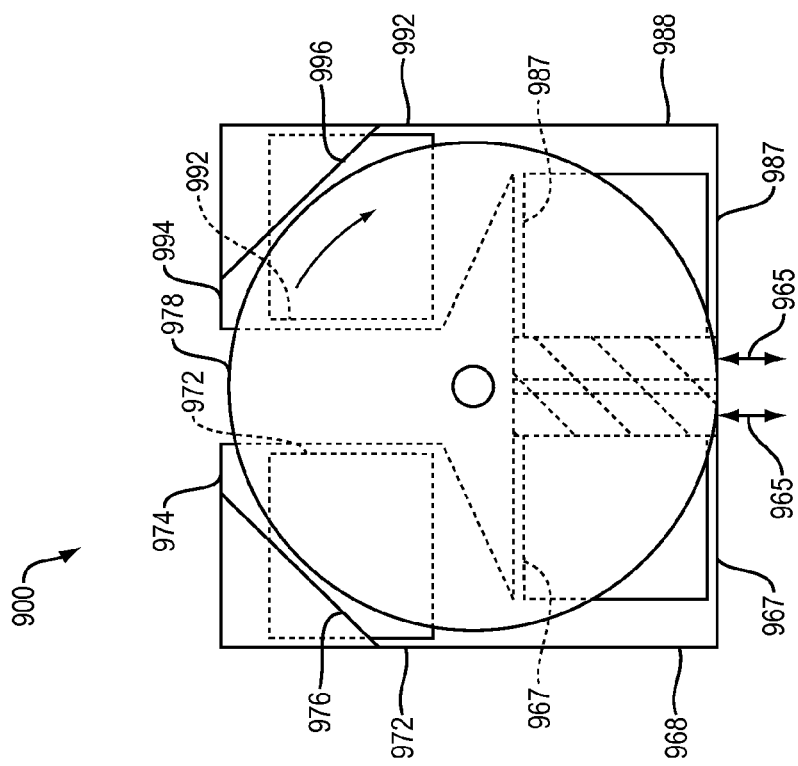
FIG. 9B
FIG. 9A

MULTIPLE DEGREE OF FREEDOM ACTUATOR AND METHOD

CROSS-REFERENCE TO RELATED APPLICATIONS

This application claims priority under 35 U.S.C. §119 to the following U.S. Provisional Patent Application of which is hereby incorporated by reference in its entirety: U.S. Ser. No. 61/482,273 filed May 4, 2011.

COPYRIGHT STATEMENT

A portion of the disclosure of this patent application document contains material that is subject to copyright protection including the drawings. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present disclosure relates to devices, systems, and methods for actuating one or more degrees of freedom.

2. Description of the Prior Art

In the control of physical systems, actuators are often used to transform a control signal into a desired mechanical output. Typically, an actuator comprises a transducer, which transforms the control signal into a mechanical force or displacement, and a means of coupling the mechanical output of the transducer to the appropriate body. In many cases, it is desired to control more than one degree of freedom (DOF) and so one actuator—and, therefore, one transducer—is required for each controlled DOF.

Various transduction mechanisms exist for transforming a (often electrical) control signal into a mechanical output. In many cases, the transduction mechanism incurs the most cost for an actuator. For example, an electromagnetic transducer often relies on relatively heavy and expensive copper, iron, and magnets to accomplish transduction. Piezoelectric transducers, also, can incur high material costs and often require relatively expensive and sophisticated high-voltage driver electronics. It would thus be advantageous to actuate multiple DOFs using a single transducer to reduce cost, weight, and complexity.

Various attempts (e.g. unidrive robots, robots using a single motor and a system of clutches to independently actuate multiple DOFs) have been made to accomplish multiple-DOF actuation using a single transducer, but they have often involved relatively complicated systems for distributing the mechanical output to the appropriate DOFs, the complexity of which has limited the benefits obtained from eliminating additional transducers.

Accordingly, there is a need for new devices, systems, and procedures for simply and reliably actuating multiple DOFs using a single transducer.

The following application seeks to solve the problems stated.

SUMMARY OF THE INVENTION

Methods, systems, and devices are generally provided for actuating multiple DOFs from a single transducer. The actuation system disclosed distributes the mechanical energy generated from a vibrating transducer comprising, with its intrinsic (as well as any additional) mass and stiffness, a primary oscillator, through a set of coupling compliances to a set of secondary oscillators each tuned to its own particular amplified response frequency and driving a mechanical load corresponding to a particular DOF. Individual DOFs can be actuated by driving the transducer at the frequency corresponding to the amplified response frequency of the secondary oscillator associated with a particular DOF such that much of the vibrational energy at that frequency is transferred to that DOF. Multiple DOFs can be actuated simultaneously by driving the transducer with a signal consisting of a superposition of multiple frequencies such that much of the vibrational energy at each frequency is transferred to the DOF corresponding to that frequency. This provides for a simple means of actuating multiple DOFs using a single transducer that can be applied in a wide variety of applications.

In one embodiment an actuator having multiple degrees of freedom comprises: a transducer configured to generate a plurality of frequencies; a primary oscillator comprised of a primary mass and a primary compliance that is configured to receive and transmit energy from the transducer; a plurality of secondary oscillators configured to receive a portion of the transmitted energy from the primary oscillator, wherein each secondary oscillator is comprised of a secondary mass and a secondary compliance, wherein each secondary oscillator is tuned to have an amplified response about at least one frequency, and wherein each secondary oscillator is configured to actuate an output member at the amplified response frequency.

In another embodiment, the vibration energy transferred from the transducer and its associated primary oscillator to a DOF corresponding to a particular secondary oscillator can be rectified by introducing a tertiary oscillator whose amplified response frequency is made to substantially coincide with that of the secondary oscillator. When the secondary oscillator corresponding to a particular DOF is excited at its amplified response frequency, the interaction of the tertiary oscillator and an output member generates an elliptical pattern of motion from the combined motion of the secondary and tertiary oscillators that then causes the output member to be driven in one direction. This provides for a simple and reliable means of rectifying the vibration energy transferred to a DOF to drive an output continuously.

In one exemplary embodiment, simple flexure elements provide the constraints, compliances, and all or part of the mass associated with each secondary and tertiary oscillator. This greatly simplifies the design and manufacture of the output stages for each DOF, making it possible that the incremental cost and complexity for each additional controlled DOF could be greatly reduced when compared to other methods of actuating multiple DOFs.

In another exemplary embodiment, two secondary oscillator outputs with distinct amplified response frequencies can be used to drive a single output member in both forward and reverse directions by being configured to drive the output member in one direction at the amplified response frequency of one of the secondary oscillators and in the opposite direction at the amplified response frequency of the other secondary oscillator. This provides a simple and reliable means of achieving bi-directional motion.

BRIEF DESCRIPTION OF THE DRAWINGS

This invention will be more fully understood from the following detailed description taken in conjunction with the accompanying drawings, in which:

FIGS. 6A-B illustrate lateral and perspective views of a rectifying mechanism using flexures.

FIGS. 8A-B illustrate lateral views of an embodiment configured to produce bi-directional motion of an output member in both the counter-clockwise and clockwise directions when responding to two different frequencies, $f_1$ and $f_2$, respectively.

FIGS. 9A-B illustrate lateral and perspective views of an embodiment, which, by placing flexures in separate planes, achieves a particularly compact form factor.

DETAILED DESCRIPTION OF THE PREFERRED EMBODIMENT

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

DEFINITIONS

For purposes of this application the following definitions are given to clarify and expound and are not intended to be limiting.

Oscillator: A mechanical system minimally comprising a compliance and a mass, which, when excited at its resonant frequency, experiences an amplified response, for an underdamped system. In some systems comprising a plurality of oscillators, each individual oscillator may have multiple resonant frequencies.

Degree of Freedom: An axis of rotation or translation of a physical body, e.g. a solid body has six degrees of freedom associated with its three translational and three rotational axes.

Compliance: An element or field that permits a displacement in proportion to a force applied in the direction of the compliance including springs, flexures, electromagnetic fields and so forth.

Transducer moving mass: The mass that experiences the same displacement as the transducer.

Output member: The body that is driven by an oscillator.

EMBODIMENTS

Figure 1:
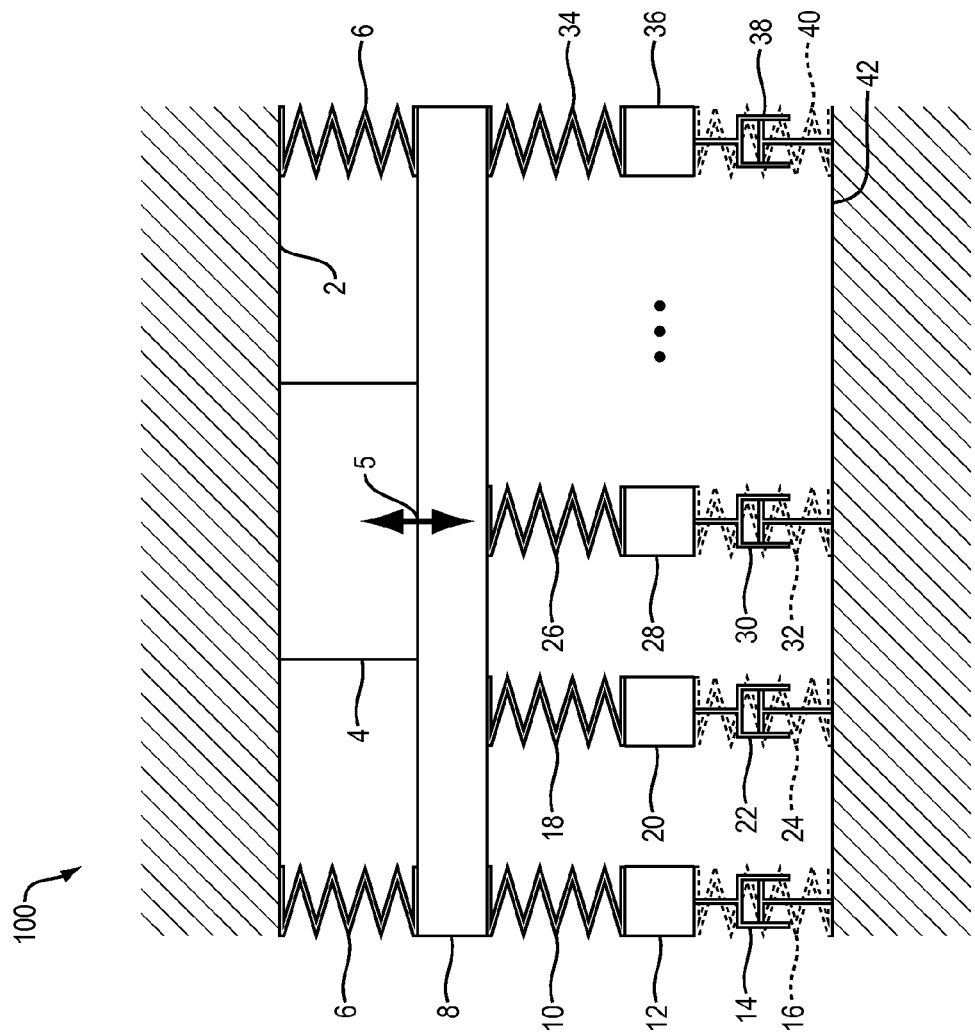
FIG. 1 is a schematic view of a multiple degree of freedom actuation system.

FIG. 1 illustrates the disclosed system 100 for actuating multiple DOFs using a single transducer. Transducer 4, attached to base 2, acts on mass 8, which includes the moving mass of the transducer itself and any additional mass rigidly coupled to the moving mass of the transducer. Mass 8 is coupled to the base 2 by compliance 6, which includes the compliance of the transducer itself and any additional compliance between mass 8 and base 2. The primary moving mass 8 is coupled to a plurality of secondary masses 12, 20, 28, 36 through coupling compliances 10, 18, 26, 34. Masses 12, 20, 28, 36 are coupled to mechanical loads 14, 22, 30, 38. Although the loads are depicted as viscous loads, they could be any type of mechanical load, including but not limited to inertial loads, gravity loads, friction loads or any combination thereof. Masses 12, 20, 28, 36 may be additionally coupled to base 42 through compliances 16, 24, 32, 40, which could be associated with a flexure bearing between the base and the masses, or could serve to raise the amplified response frequency of the oscillators. Although base 42 is depicted as a single body, it could be composed of multiple bodies as well, which could be able to move independently relative to each other.

FIG. 1 shows masses $m_1$ through $m_n$ (e.g. 12, 20, 28, 36) attached through springs $k_{01}$ through $k_{0n}$ (e.g. 10, 18, 26, 34) with intrinsic damping $c_{01}$ through $c_{0n}$ (not shown) to a moving mass $m_0$ (e.g. 8), which is being driven by a transducer with force F. Masses $m_4$ through $m_n$ may also be connected through springs $k_1$ through $k_n$ (e.g. 16, 24, 32, 40) with intrinsic damping $c_1$ through $c_n$ (not shown) to ground, and mass $m_0$ is connected through spring $k_0$ (e.g. 6) with intrinsic damping $c_0$ (not shown) to ground. The displacements of masses $m_0$ through $m_n$ are denoted by $\chi_0$ through $\chi_n$, respectively.

The equations of motion are $$m_0\ddot{x}_0 + (c_{01} + c_0)\dot{x}_0 + (k_{01} + k_0)x_0 = \sum_{i=1}^{n}(c_{0i}\dot{x}_i + k_{0i}x_i) + F, \quad (1)$$

$$m_1\ddot{x}_1 + (c_{01} + c_1)\dot{x}_1 + (k_{01} + k_1)x_1 = c_{01}\dot{x}_0 + k_{01}x_0,$$

$$\vdots$$

$$m_n\ddot{x}_n + (c_{0n} + c_n)\dot{x}_n + (k_{0n} + k_n)x_n = c_{0n}\dot{x}_0 + k_{0n}x_0.$$

For a complex sinusoidal input of the form $F=F_0 e^{j\omega t}$ with angular frequency $\omega$, we assume steady-state outputs of the form $\chi_i = X_i e^{j\omega t + \phi_i}$, $i=1,\ldots,n$ with the same angular frequency $\omega$, but frequency-dependent magnitudes $X_i$ and phases $\phi_i$, $i=1,\ldots,n$. The derivatives of $\chi_i$ are then given by $\ddot{\chi}_i = -\omega^2 \chi_i$, $\dot{\chi}_i = j\omega\chi_i$. Substituting these derivatives into Equation 1, canceling the common $e^{j\omega t}$ terms and normalizing, we get $$\begin{bmatrix} 1-\left(\frac{\omega}{\omega_0}\right)^2+j2\zeta_0\left(\frac{\omega}{\omega_0}\right) & -\left(a_{01}+j2\zeta_{01}\frac{\omega}{\omega_0}\right) & \cdots & -\left(a_{0n}+j2\zeta_{0n}\frac{\omega}{\omega_0}\right) \\ -\left(a_{11}+j2\zeta_{11}\frac{\omega}{\omega_1}\right) & 1-\left(\frac{\omega}{\omega_1}\right)^2+j2\zeta_1\left(\frac{\omega}{\omega_1}\right) & \cdots & 0 \\ \vdots & \vdots & \ddots & \vdots \\ -\left(a_{nn}+j2\zeta_{nn}\frac{\omega}{\omega_n}\right) & 0 & \cdots & 1-\left(\frac{\omega}{\omega_n}\right)^2+j2\zeta_n\left(\frac{\omega}{\omega_n}\right) \end{bmatrix} \begin{bmatrix} X_0 e^{j\phi_0} \\ X_1 e^{j\phi_1} \\ \vdots \\ X_n e^{j\phi_n} \end{bmatrix} = \begin{bmatrix} X^* \\ 0 \\ \vdots \\ 0 \end{bmatrix}, \quad (2)$$

where $$X^* = \frac{F_0}{k_0 + \sum_{i=1}^{n} k_{0i}}, \quad \omega_0 = \sqrt{\frac{k_0 + \sum_{i=1}^{n} k_{0i}}{m_0}},$$

$$\omega_i = \sqrt{\frac{k_{0i} + k_i}{m_i}}, \quad \zeta_0 = \frac{c_0 + \sum_{i=1}^{n} c_{0i}}{2\sqrt{\left(k_0 + \sum_{i=1}^{n} k_{0i}\right) m_0}},$$

and $$\zeta_i = \frac{c_{0i} + c_i}{2\sqrt{(k_{0i} + k_i) m_i}}, \quad \zeta_{0i} = \frac{c_{0i}}{2\sqrt{(k_{0i} + k_0) m_0}},$$

$$\zeta_{ii} = \frac{c_{0i}}{2\sqrt{(k_{0i} + k_i) m_i}}, \quad a_{0i} = \frac{k_{0i}}{k_{0i} + k_0},$$

and $$a_{ii} = \frac{k_{0i}}{k_{0i} + k_i}.$$

We can write Equation 2 in abbreviated form as $$\begin{bmatrix} d_0 & g_1 & g_2 & \cdots & g_n \\ f_1 & d_1 & 0 & \cdots & 0 \\ f_2 & 0 & d_2 & \cdots & 0 \\ \vdots & \vdots & \vdots & \ddots & \vdots \\ f_n & 0 & 0 & 0 & d_n \end{bmatrix} \begin{bmatrix} X_0 e^{j\phi_0} \\ X_1 e^{j\phi_1} \\ X_2 e^{j\phi_2} \\ \vdots \\ X_n e^{j\phi_n} \end{bmatrix} = \begin{bmatrix} X^* \\ 0 \\ 0 \\ \vdots \\ 0 \end{bmatrix}, \quad (3)$$

where $$d_i = 1 - \left(\frac{\omega}{\omega_i}\right)^2 + j2\zeta_i\left(\frac{\omega}{\omega_i}\right), \quad i = 0, \ldots, n; \quad f_i = -\left(a_{ii} + j2\zeta_{ii}\frac{\omega}{\omega_i}\right), \quad i = 1, \ldots, n;$$

and $$g_i = -\left(a_{0i} + j2\zeta_{0i}\frac{\omega}{\omega_0}\right), \quad i = 1, \ldots, n.$$

We can obtain the solution of Equation 3 from Cramer's rule as $$\frac{X_0 e^{j\phi_0}}{X^*} = \frac{\prod_{i=1}^{n} d_i}{\prod_{i=0}^{n} d_i - \sum_{i=1}^{n} \left( f_i g_i \prod_{\substack{j=1 \\ j \neq i}}^{n} d_j \right)}, \quad (4)$$

$$\frac{X_i e^{j\phi_i}}{X^*} = \frac{-f_i \prod_{\substack{j=1 \\ j \neq i}}^{n} d_j}{\prod_{i=0}^{n} d_i - \sum_{i=1}^{n} \left( f_i g_i \prod_{\substack{j=1 \\ j \neq i}}^{n} d_j \right)}, \quad i = 1, \ldots, n. \quad (5)$$

Note that for each forcing frequency $\omega = \omega_i$, $i = 1, \ldots, n$, the numerators of all but the $i^{th}$ output approach zero for an underdamped system, and thus only the $i^{th}$ output will experience a significant amplified response near that frequency. Therefore, the described system can be used to obtain multiple independent outputs from a single transducer by exciting specific outputs based on the input frequency or frequencies of the transducer. FIG. 2 shows a plot of the velocity magnitude response of the outputs for n=3 and some representative parameter values. Note that output velocities $u_1$, $u_2$, and $u_3$ are excited independently at (approximate) frequencies $$f_1 = \frac{\omega_1}{2\pi}, f_2 = \frac{\omega_2}{2\pi},$$

and $$f_3 = \frac{\omega_3}{2\pi},$$

respectively.

Masses 12, 20, 28, 36 together with compliances 10, 18, 26, 34 and, in some cases, compliances 16, 24, 32, 40, form a plurality of secondary oscillators. By varying the masses and/or compliances for each secondary oscillator, the oscillators can be made to have distinct amplified response frequencies, at or near which they will experience magnified vibration amplitude. This amplified response frequency can be approximated as $$f_i \approx \frac{1}{2\pi}\sqrt{\frac{k_i}{m_i}},$$

where $k_i$ is the combined stiffness of all compliances coupled to mass $m_i$. Furthermore, at one secondary oscillator's amplified response frequency, the other secondary oscillators in the system will experience comparatively smaller vibration amplitude. Thus, when the transducer is driven at a particular secondary oscillator's amplified response frequency, the mechanical load (in some cases an output member) coupled to that secondary oscillator will receive an increased proportion of the power in the system.

FIGS. 2A-2D illustrate the frequency behavior of a multi-DOF actuating system, such as 100 described by FIG. 1, having three secondary oscillators corresponding, for example, to masses 12, 20, 28 of 100 in FIG. 1. The output velocities $u_1$, $u_2$, $u_3$ of the secondary oscillators are greatly magnified at their respective amplified response frequencies. Though each oscillator may have multiple resonant frequencies (e.g. 216, 214, 212, 210, for the first output), only some (e.g. 212, for the first output) of these resonant frequencies cause the oscillator to exhibit a greatly magnified or amplified output velocity response. The output powers delivered to the corresponding mechanical loads are thus also magnified or amplified. The frequency response of a system like that shown in FIGS. 2A-2D permits the actuation of multiple DOFs by exciting the amplified response frequencies of the DOFs desired to be actuated. For example, if it is desired to simultaneously actuate DOFs corresponding to $u_1$ and $u_2$, but not $u_3$, frequencies $f_1$ and $f_2$ would be excited, but not $f_3$.

Figure 2A:
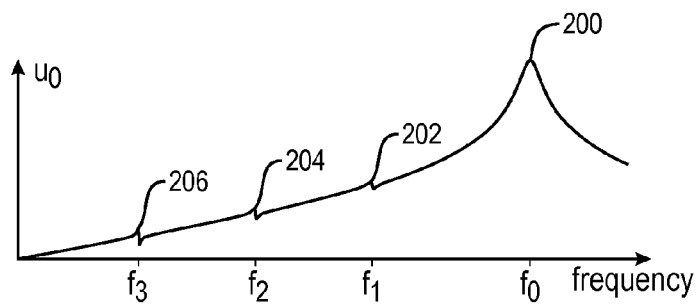
FIGS. 2A-D illustrate a representative frequency response of a multiple degree of freedom actuation system, such as the one shown in FIG. 1, having three secondary oscillators and, thus, three output degrees of freedom.

FIG. 2A shows the frequency response of the primary mass (e.g. 8 of FIG. 1), which exhibits a peak 200 at resonant frequency $f_0$. It also experiences much lower peaks 202, 204, 206 at frequencies $f_1$, $f_2$, $f_3$, respectively.

Figure 2B:
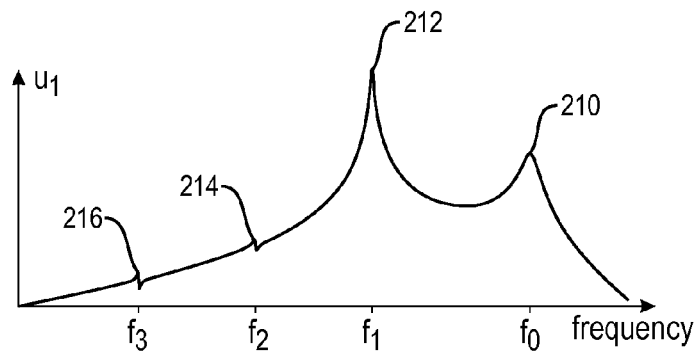

FIG. 2B shows the frequency response $u_1$ of the first secondary mass (e.g. 12 of FIG. 1), which exhibits an amplified response 212 at frequency $f_1$. It also shares a peak 210 with the primary mass 8 at frequency $f_0$. It experiences much lower peaks 214, 216 at frequencies $f_2$, $f_3$, respectively.

Figure 2C:
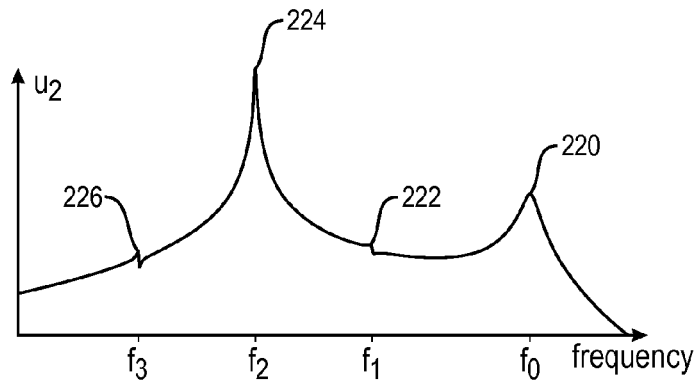

FIG. 2C shows the frequency response $u_2$ of the second secondary mass (e.g. 20 of FIG. 1), which exhibits an amplified response 224 at frequency $f_2$. It also shares a peak 220 with the primary mass 8 at frequency $f_0$. It experiences much lower peaks 222, 226 at frequencies $f_1$, $f_3$, respectively.

Figure 2D:
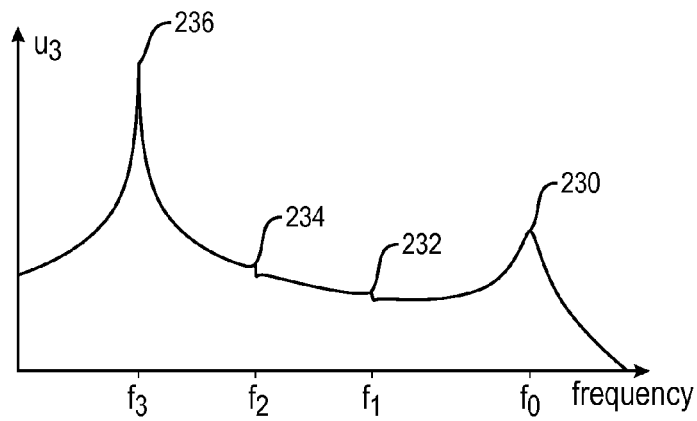

FIG. 2D shows the frequency response $u_3$ of the third secondary mass (e.g. 28 of FIG. 1), which exhibits an amplified response 236 at frequency $f_3$. It also shares a peak 230 with the primary mass 8 at frequency $f_0$. It experiences much lower peaks 232, 234 at frequencies $f_1$, $f_2$, respectively.

Thus, each secondary oscillator may be individually excited and drive or actuate their respective output member. As mentioned above, some or all of them by may be simultaneously actuated. To prevent undesired simultaneous actuation it is contemplated that certain systems may be configured with minimum velocity (and thus displacement) requirements in order to cause their respective output member to actuate. One way of accomplishing this is by de-coupling the output member from the secondary oscillator as illustrated by gap 61 in FIG. 4 and discussed below.

Figure 3:
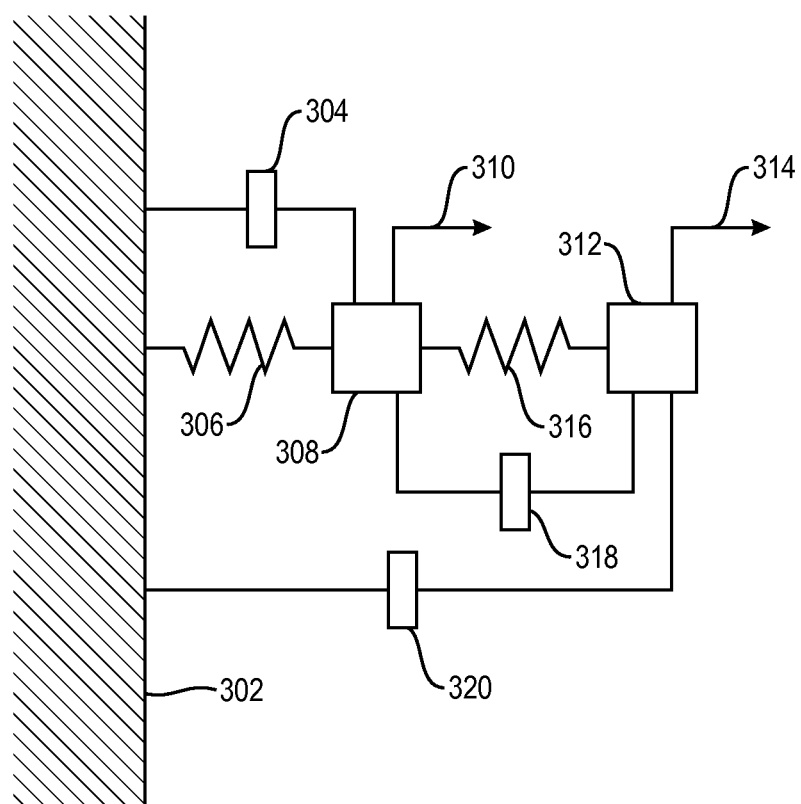
FIG. 3 is a schematic view of a prior art mechanism for actuating a MEMS device.

FIG. 3 illustrates a prior art mechanical model for a MEMS device having two oscillatory masses 308 and 312, which are driven by two separate input forces 310 and 314. Spring 306 connects mass 308 to ground 302 and coupling spring 316 connects mass 312 to mass 308. Various dashpots 304, 318, and 320 are also shown in the system. As described, input force 310 may act on oscillatory mass 308 without causing displacement to mass 312. In other configurations, input force 310 may cause displacement in 308 and 312 and input force 314 may be used in a number of configurations to either add to the displacement of 308, 312, or reduce displacement of 312 while 308 maintains oscillating motion. However, what the prior art does not teach is having a single primary oscillating mass used to transfer vibrational energy to a plurality of secondary oscillating masses, which may be actuated independently from one another.

Figure 4:
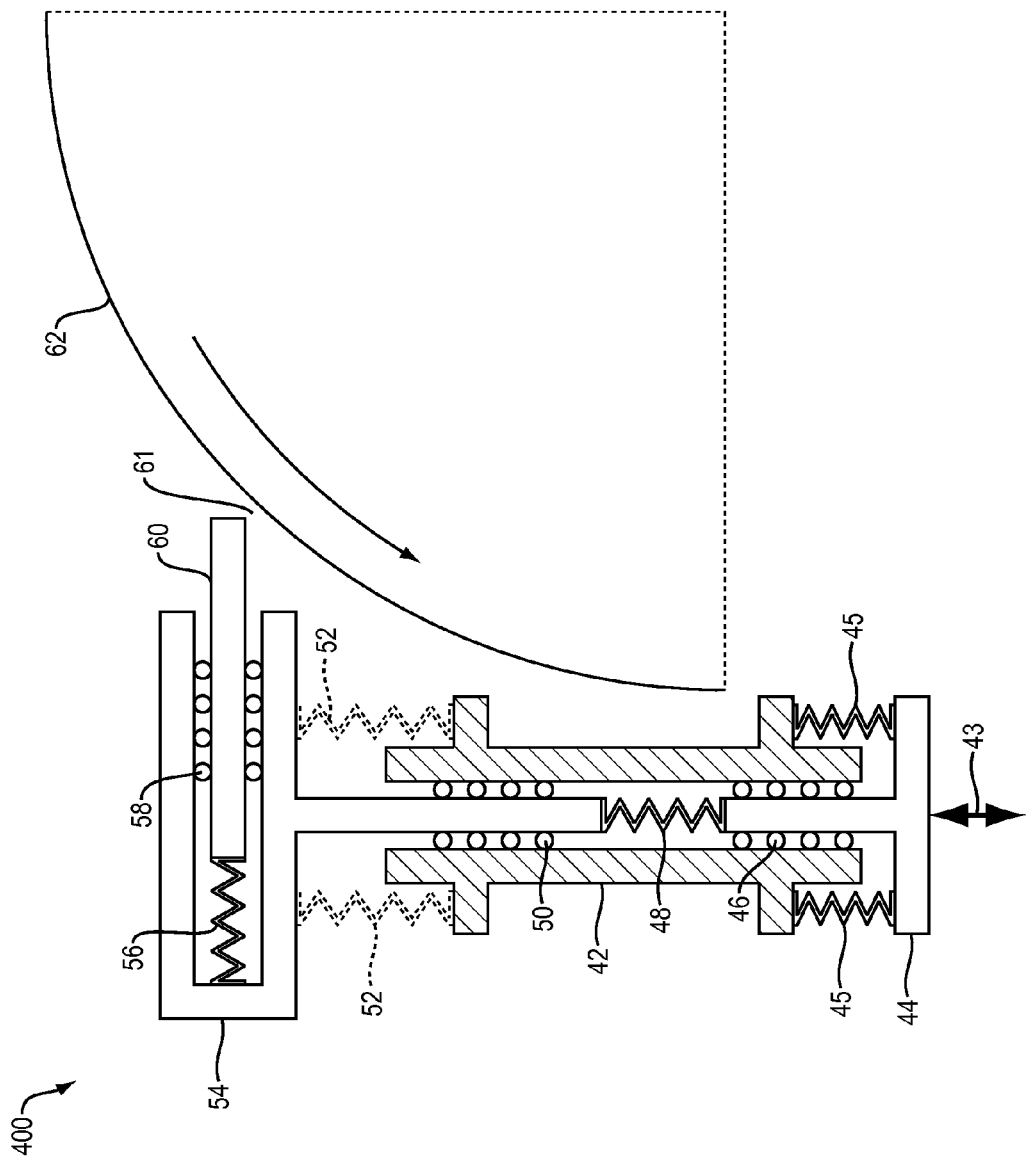
FIG. 4 is a lateral view of a mechanism for rectifying vibrations to produce continuous motion.
Figure 5A:
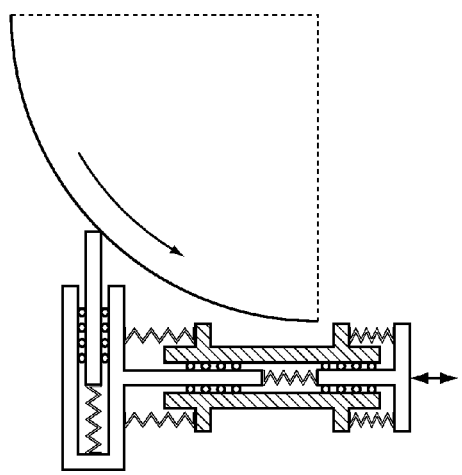
FIGS. 5A-H illustrate a motion sequence by which the rectifier of FIG. 4 converts vibrations to continuous motion.
Figure 5B:
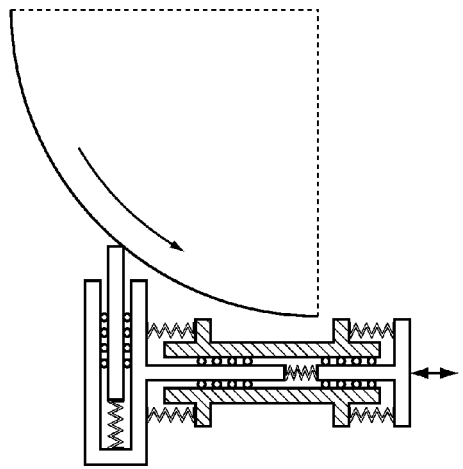
Figure 5C:
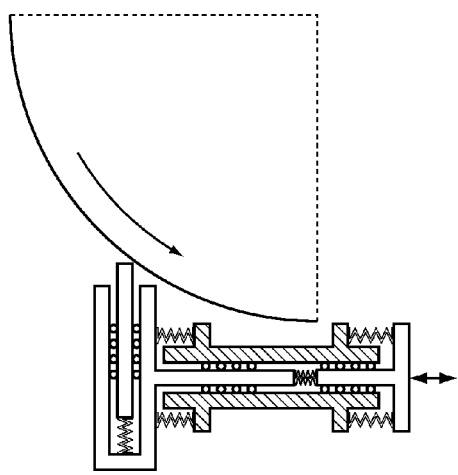
Figure 5D:
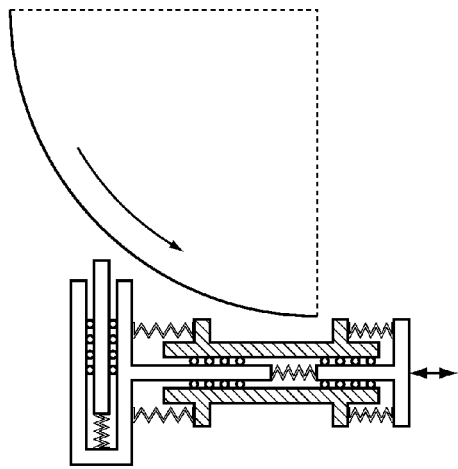
Figure 5E:
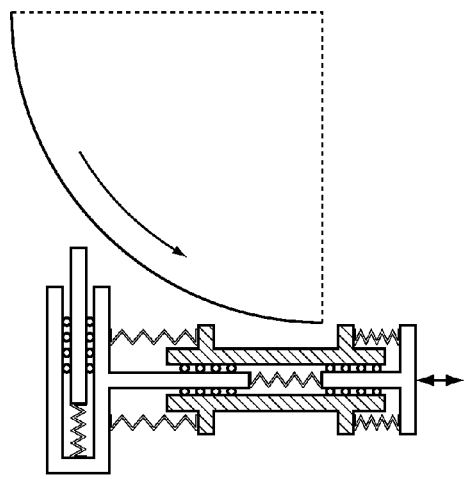
Figure 5F:
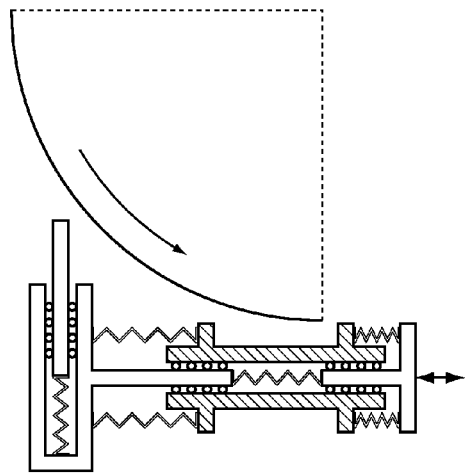
Figure 5G:
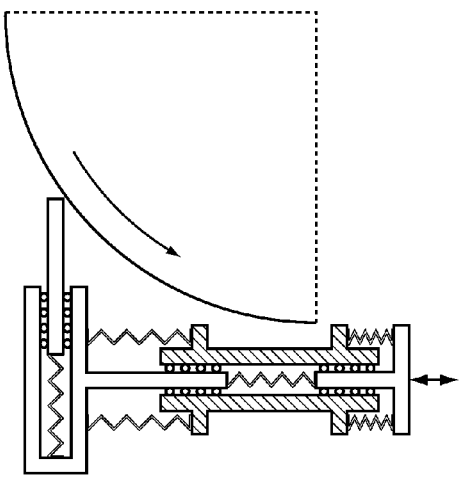
Figure 5H:
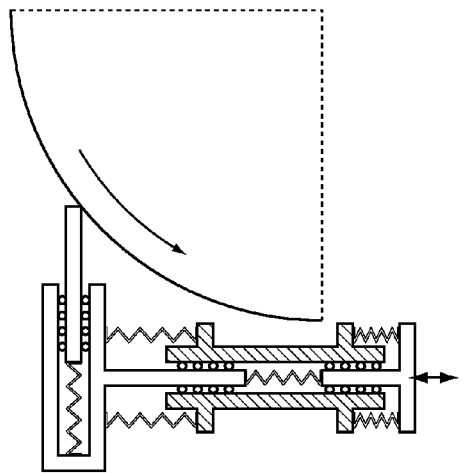
Figure 7B:
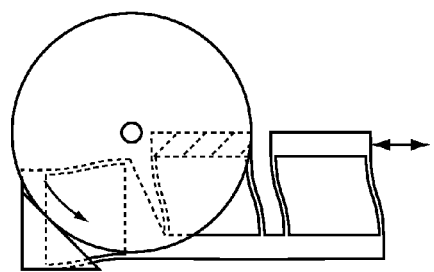
FIGS. 7A-H illustrate a motion sequence by which the flexure rectifier of FIGS. 6A-B converts vibrations into continuous motion.
Figure 7D:
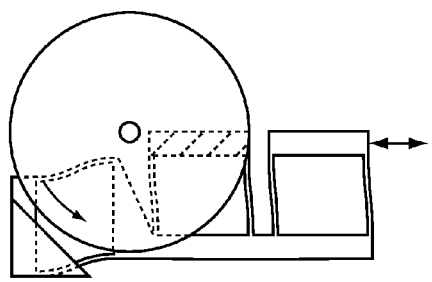
Figure 7A:
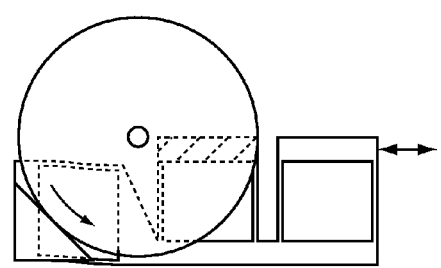
Figure 7C:
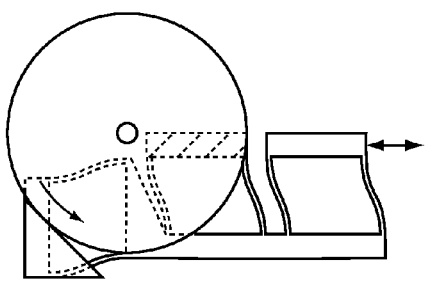
Figure 7E:
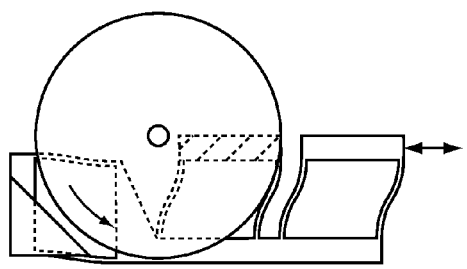
Figure 7F:
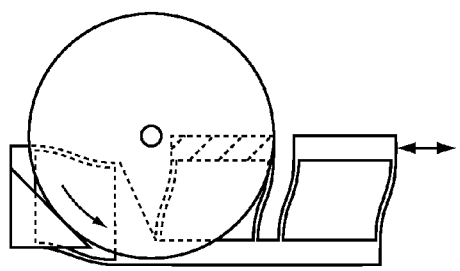
Figure 7G:
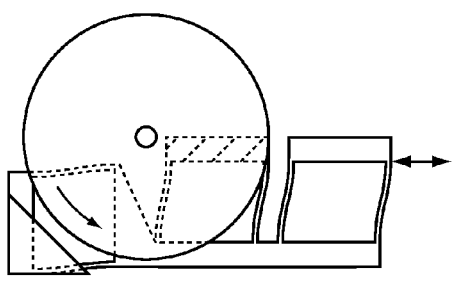
Figure 7H:
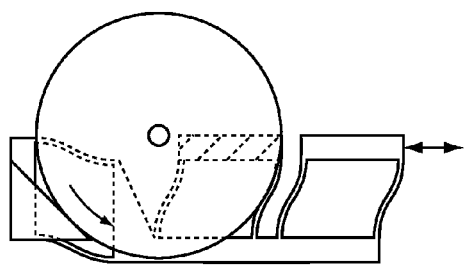

FIG. 4 shows an embodiment of oscillator/rectifier system 400 for rectifying vibrational energy into a continuous motion driving output member 62. Moving mass 44, which is directly coupled to the moving mass of the transducer (not shown) is acted on by force 43 transmitted from the transducer. Mass 44 and compliance 45 together form in part the primary oscillator of 400. Mass 44 is supported by bearings 46 and coupled through coupling compliance 48 to mass 54, which is supported by bearings 50. Mass 54 may also be coupled to base 42 (shown cross-hatched as it is grounded) through compliance 52. Mass 54 and compliance 48 and, in some cases, compliance 52 together form a secondary oscillator, having resonant frequency $f_1$, that is driven through coupling compliance 52 by the primary oscillator mass 44. Mass 60 is supported by bearings 58, which constrain the motion of mass 60 to be a superposition of the vertical motion of mass 54 and a complementary motion in a direction different (non-collinearly) from that of mass 54 and, in some cases, preferably orthogonal to it. Here it is shown as a horizontal motion. Mass 60 is coupled through compliance 56 to mass 54. Mass 60 and compliance 56 together form a tertiary oscillator with resonant frequency $f_{1t}$. Preferentially, $f_{1t}$ is made to coincide with $f_1$, the secondary oscillator resonant frequency. In some cases, there will exist a gap 61 between the tertiary oscillator (56, 60) and output member 62 such that, when the secondary oscillator of mass 54 is driven at a frequency other than its resonant frequency, its amplitude will be low enough not to force the tertiary mass 60 into contact with the output member 62. When the secondary oscillator (54, 48, 52) is driven at its amplified response frequency, however, its amplitude will cause the tertiary mass 56 to alternately make and break contact with the output member 62. The angle of the surface of the output member 62 is then such that the normal force between the tertiary mass 60 and the output member 62 when they are in contact causes the combined system of secondary oscillator (54, 48, 52) and tertiary oscillator (56, 60) to execute an elliptical motion. This elliptical motion then drives the output member 62 in a continuous direction, shown here as a counterclockwise rotation. Although the output motion here is shown as the rotation of a circular output member (i.e. rotor), other output motions, such as the translation of a flat output member, are also possible. In other embodiments, an output member may include a spherical member, a helical member, or any other member that may be translated and/or rotated.

One form of a rectifier (a tertiary oscillator coupled to a secondary oscillator) was thus described in FIG. 4; however, other forms include one-way clutch designs, an anisotropic friction surface (one that has friction in a first direction and limited or negligible friction in the opposite direction) and so forth. The purpose of the rectifier is to transform an oscillating motion of the secondary oscillator into a continuous motion of an output member.

FIGS. 5A-5H illustrate the oscillator/rectifier system 400 of FIG. 4 rectifying vibration into continuous motion of the output member 62 through the elliptical motion of the secondary and tertiary oscillators.

As discussed above, if the amplified response frequency of the secondary oscillator is not being excited from the transducer through the primary oscillator, limited or no displacement occurs. If limited displacement occurs, the gap 61 prevents output member 62 from receiving any input energy from the oscillator/rectifier. A plurality of 400 oscillator/rectifier systems may be used to actuate multiple degrees of freedom, wherein each 400 system shares the same primary oscillator.

FIG. 6A shows an exemplary embodiment of an oscillator/rectifier system 600 functioning similarly to the oscillator/rectifier 400 of FIG. 4, but adapted to make advantageous use of flexure bearings and compliances. Mass 66, which is directly coupled to the moving mass of the transducer (not shown), is acted on by force 65 transmitted from the transducer. Mass 66 may comprise part of the mass of the primary oscillator. Mass 66 is coupled through flexure coupling compliance 67 to mass 68. Mass 68 is supported and guided by flexure bearing 70, which has some inherent compliance and is attached at its other end to base 64. The system of mass 68 and compliances 67 and 70 together form a secondary oscillator with amplified response frequency $f_1$. Mass 74 is supported by flexure bearings 72, which constrain the motion of mass 74 to be a superposition of the vertical motion of mass 68 and a complementary motion in a direction different from that of mass 68 and, in some cases, preferably orthogonal to it. Here it is shown as a horizontal motion. Mass 74 and compliance 72 together form a tertiary oscillator with amplified response frequency $f_{1t}$. Preferentially, $f_{1t}$ is made to coincide with $f_1$. In some cases, there will exist a gap 77 between the tertiary oscillator 74 and output member 78 such that, when the secondary oscillator (68, 67, 70) is driven at a frequency other than its amplified response frequency, its amplitude will be low enough not to force the contact surface 76, which is rigidly attached to 74, into contact with the output member 78. When the secondary oscillator (68, 67, 70) is driven at its amplified response frequency, however, its amplitude will cause the contact surface 76 alternately to make and break contact with the output member 78. The angle of the contact between 76 and output member 78 is then such that the normal force between the tertiary oscillator 74 and the output member 78 when they are in contact causes the combined system of secondary oscillator (68, 67, 70) and tertiary oscillator (74, 72) to execute an elliptical motion. This elliptical motion then drives the output member 78, supported by bearing 79, in a continuous direction.

FIG. 6B shows a perspective view of the oscillator/rectifier of FIG. 6A.

FIGS. 7A-7H show the system of FIGS. 6A and 6B rectifying vibration into continuous motion of the output member through the elliptical motion of the secondary and tertiary oscillators.

FIGS. 8A and 8B illustrate adapting system 600 of FIG. 6 to achieve bi-directional motion of the driven output member 878 by placing separate oscillator/rectifiers, each with a distinct amplified response frequency, on either side of the output member 878. Here, as shown, are two distinct oscillator/rectifiers; however, within the scope of this application, a third, fourth and more oscillator/rectifiers may be added to an output member that is configured to have more than two directions of motion as shown e.g. a spherical output member having a plurality of directions of motion.

FIG. 8A shows the left oscillator/rectifier of system 800a comprising masses 868 and 874 and compliances 867, 870, and 872 driving the output member 878 in a counter-clockwise direction at the amplified response frequency $f_1$ of the left oscillator/rectifier. Each oscillator is grounded by a common base 864 shown with the cross-hatched lines.

FIG. 8B shows the right oscillator/rectifier of system 800b comprising masses 888 and 894 and compliances 887, 890, and 892 driving the output member 878 in a clockwise direction at the amplified response frequency $f_2$ of the right oscillator/rectifier.

Figure 8C:
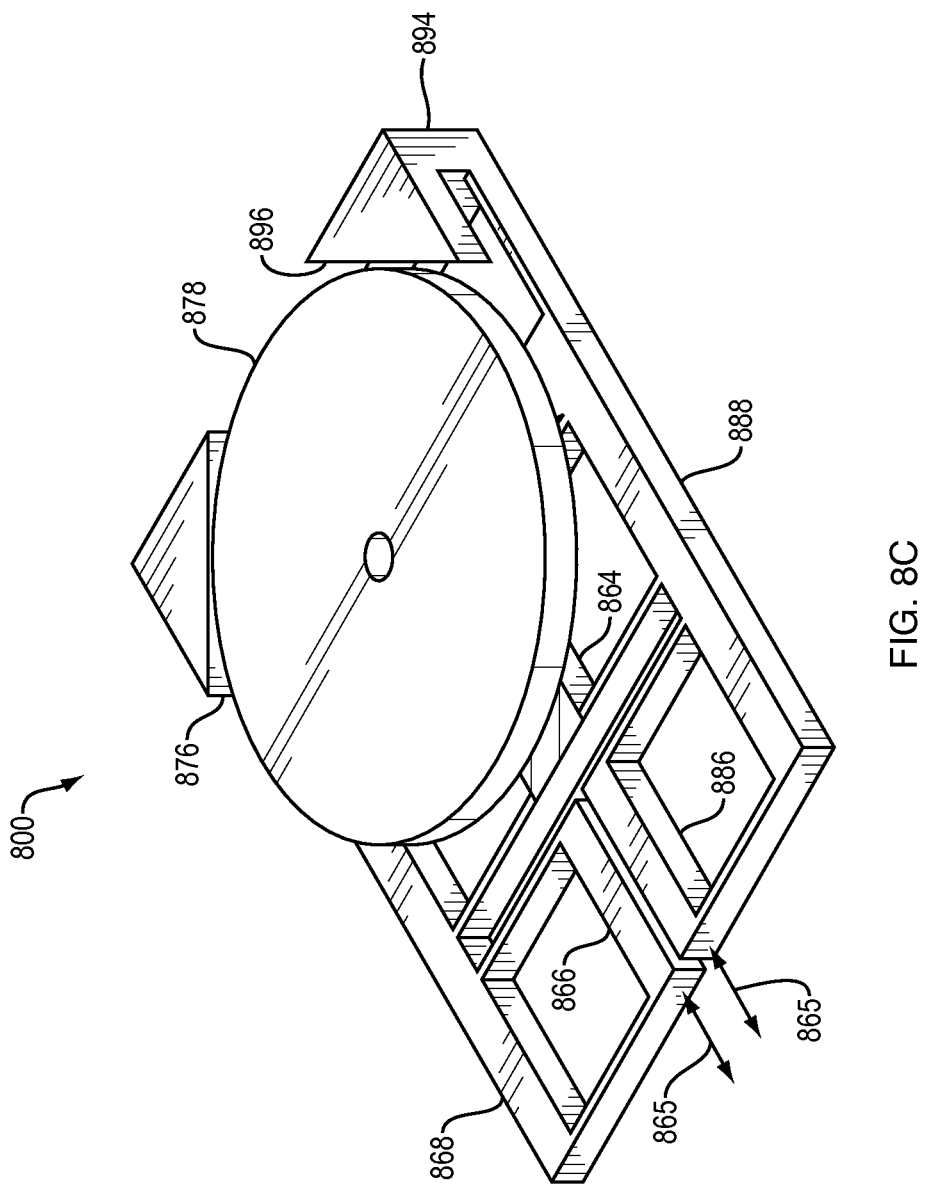
FIG. 8C is a perspective view of the embodiment illustrated by FIGS. 8A-B.

FIG. 8C shows a perspective view of the oscillator/rectifier of FIGS. 8A and 8B with force input 865 coming from a common source. Masses 866 and 886 are directly coupled to the moving (primary) mass of the transducer (not shown) transferring force input 865 into the system, wherein each side of the system responds based on the frequency of force input 865.

FIGS. 9A-9B illustrate a more compact system 900 than that shown in FIGS. 8A-C. The more compact form factor is created by placing the flexure compliances 970 and 990 in a separate plane from flexure compliances 967 and 987. Elements 964, 966, 967, 968, 970, 972, 974, 976, 978, 987, 988, 992, 994, 996 correspond to similar elements 864, 866, 867, 868, 870, 872, 874, 876, 878, 887, 888, 892, 894, 896 in FIGS. 8A-C.

Figure 9C:
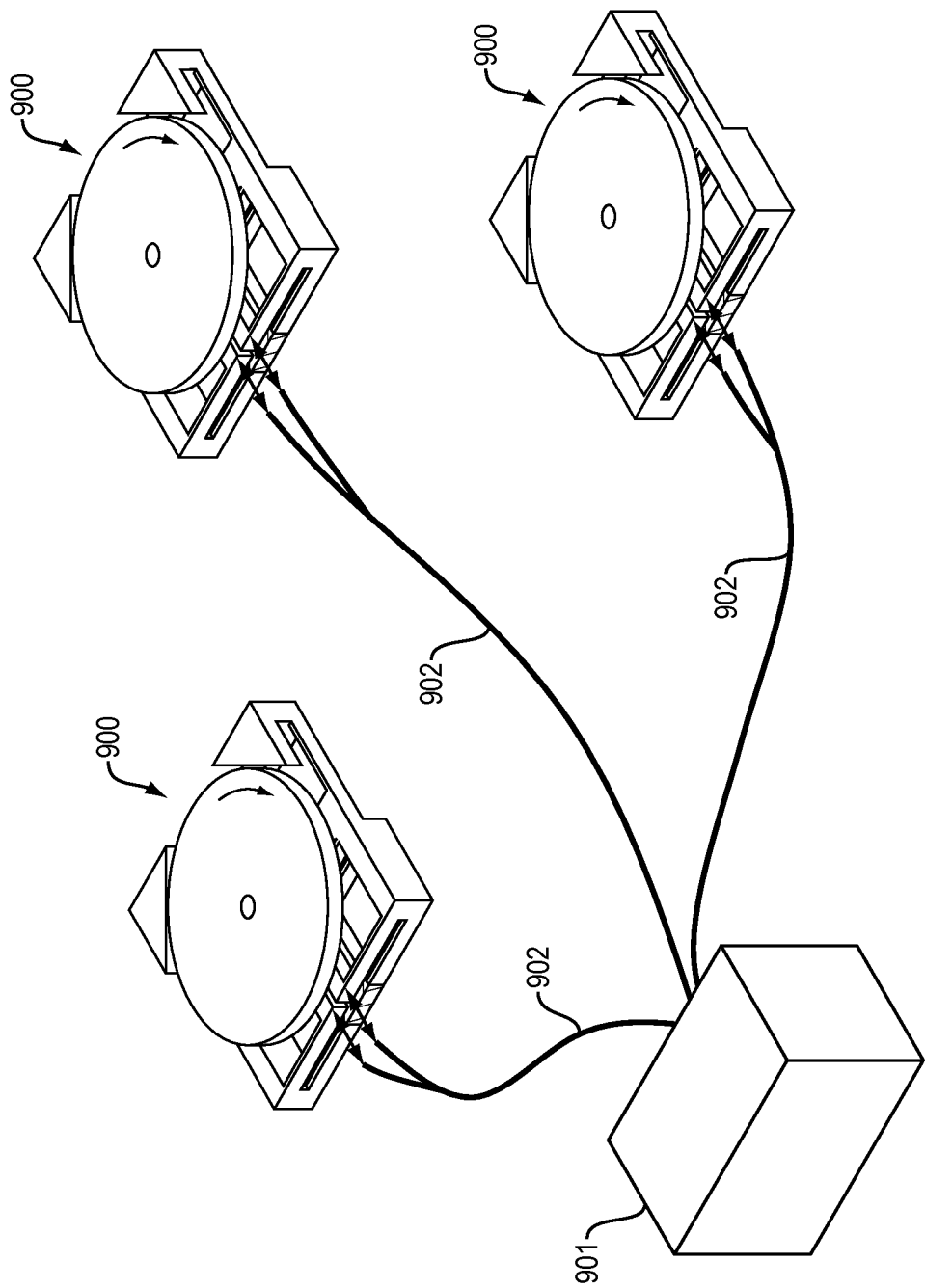
FIG. 9C illustrates a plurality of embodiments of FIGS. 9A-B simultaneously and independently actuating multiple degrees of freedom from the excitation of a single transducer.

FIG. 9C illustrates a plurality of oscillator/rectifier systems 900 of FIGS. 9A-B simultaneously and independently actuating multiple degrees of freedom from the excitation of a single transducer 901. Transmission lines 902 transfer the vibrational energy of the transducer to each of the oscillator/rectifier systems 900 and could take the form of a pull-pull cable system, a push-pull system, hydraulic or acoustic channels, or any other system capable of transferring vibrational energy from one point to another.

Figure 10:
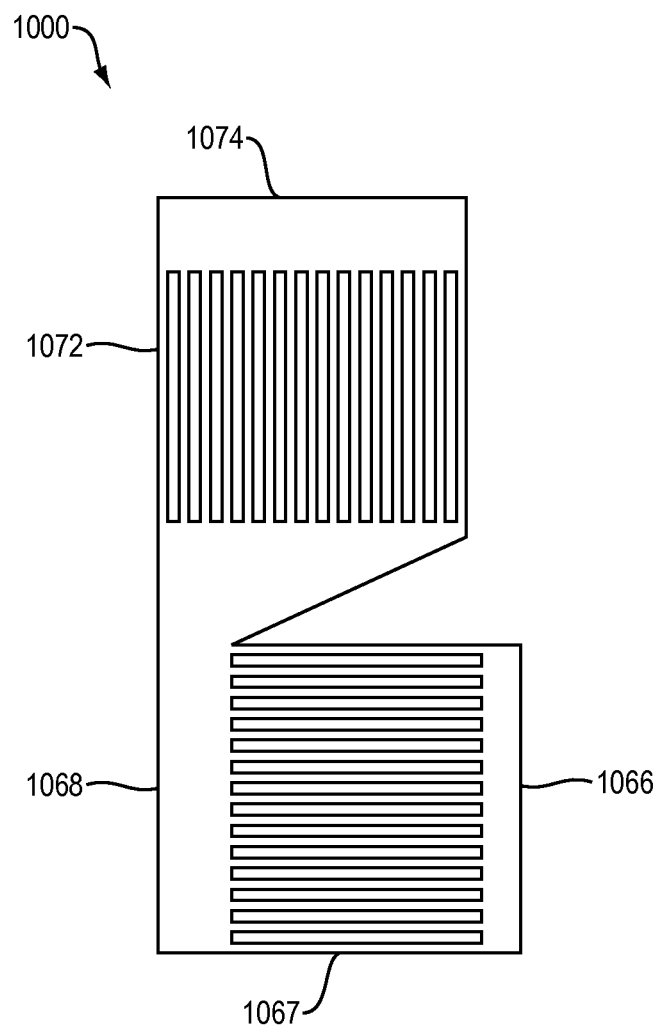
FIG. 10 is a lateral view of a flexure type that achieves a high degree of stiffness for a given flexure size.

FIG. 10 shows a flexure type 1000 achieving a high stiffness for a given size and required deflection by maximizing the volume of material under strain. Mass 1066 is coupled to mass 1068 through coupling compliance flexure 1067, shown having an increased number of beam elements, which add both stiffness and mass to the system. Together 1067 and 1068 form a secondary oscillator that is mechanically coupled/connected to mass 1074 and flexure bearings 1072, which together form a tertiary oscillator configured to displace non-linearly with the displacement of the secondary oscillator formed of 1066, 1067, and 1068; often an orthogonal motion is preferred.

It should be noted that, in some embodiments, the mass of the secondary oscillator may be augmented by the additional mass of a tertiary oscillator.

While several embodiments have been described herein that are exemplary of the present invention, one skilled in the art will recognize additional embodiments within the spirit and scope of the invention.

What is claimed is:

1. An actuator driving multiple degrees of freedom comprising:
    a transducer configured to generate a plurality of frequencies;
    a primary oscillator comprised of a primary mass and a primary compliance that is configured to receive and transmit energy from the transducer; and
    a plurality of secondary oscillators configured to receive a portion of the transmitted energy from the primary oscillator,
    wherein each secondary oscillator is comprised of a secondary mass and a secondary compliance,
    wherein each secondary oscillator is tuned to have an amplified response about at least one frequency, and
    wherein each secondary oscillator is configured to actuate an output member at the amplified response frequency.

2. The actuator of claim 1, wherein the transducer is configured to emit multiple frequencies simultaneously.

3. The actuator of claim 1, wherein the amplified response of at least one secondary oscillator occurs at a distinct frequency from the amplified response of the other secondary oscillator(s).

4. The actuator of claim 1, wherein the secondary oscillators are each configured to actuate a distinct output member.

5. The actuator of claim 1, further including a rectifier formed in part by one of the secondary oscillators and configured to actuate an output member in a continuous motion.

6. The actuator of claim 5, wherein actuation of an output member is prevented when the associated amplified response frequency of the secondary oscillator is not being produced by the transducer.

7. The actuator of claim 6, wherein a spatial gap between the rectifier and an output member exists when the associated amplified frequency of the secondary oscillator is not produced.

8. The actuator of claim 1, wherein the secondary compliance is one of a spring and flexure.

9. The actuator of claim 5, wherein the rectifier is further comprised of a tertiary oscillator that is configured to produce an amplified response in a direction that is non-collinear to a direction of motion of the secondary oscillator.

10. A method for independently actuating multiple degrees of freedom comprising the steps of:
individually exciting the amplified response frequency associated with at least one secondary oscillator of a multiple degree of freedom actuator comprising:
a primary oscillator formed in part by a primary mass and a primary compliance, and
a plurality of secondary oscillators mechanically coupled to the primary oscillator and each configured to actuate an output member(s); and
actuating an output member by the secondary oscillator excited by the associated amplified response frequency.

11. The method of claim 10, wherein the multiple degree of freedom actuator further includes a rectifier formed in part by one of the secondary oscillators and configured to actuate the output member in a continuous motion.

12. The method of claim 11, wherein a spatial gap between the rectifier and an output member exists when the associated amplified response frequency of the secondary oscillator is not produced.

13. The method of claim 11, wherein the rectifier is further comprised of a tertiary oscillator that is configured to produce an amplified response in a direction that is non-collinear to a direction of motion of the secondary oscillator.

14. An apparatus for driving a rotor comprising:
a transducer configured to generate a plurality of frequencies;
a primary oscillator configured to receive and transmit energy from the transducer;
a secondary oscillator mechanically coupled to the primary oscillator, comprised of a secondary mass and one or more secondary flexures, and tuned to have an amplified response about at least one frequency; and
a tertiary oscillator mechanically coupled to the secondary oscillator, comprised of a tertiary mass and tertiary flexure,
wherein the tertiary oscillator and secondary oscillator form a first rectifier that is configured to actuate an output member in a continuous motion.

15. The apparatus of claim 14, wherein the primary and secondary oscillators are mechanically coupled in the same plane.

16. The apparatus of claim 14, wherein the primary and secondary oscillators are mechanically coupled in different planes.

17. The apparatus of claim 14, wherein the secondary and tertiary flexures are configured to function as flexure bearings wherein each constrains motion in at least one direction.

18. The apparatus of claim 14, further including a second rectifier that is mechanically coupled to the primary oscillator and tuned to have an amplified response at a frequency distinct from that of the first rectifier and configured to actuate an output member in a continuous motion opposite of the continuous motion of the first rectifier.

19. The apparatus of claim 18, further including a third rectifier that is mechanically coupled to the primary oscillator and tuned to have an amplified response at a frequency distinct from that of the first and second rectifiers and configured to actuate an output member in a continuous motion different from the continuous motions of the first and second rectifiers.

* * * * *